UNITED STATES PATENT OFFICE.

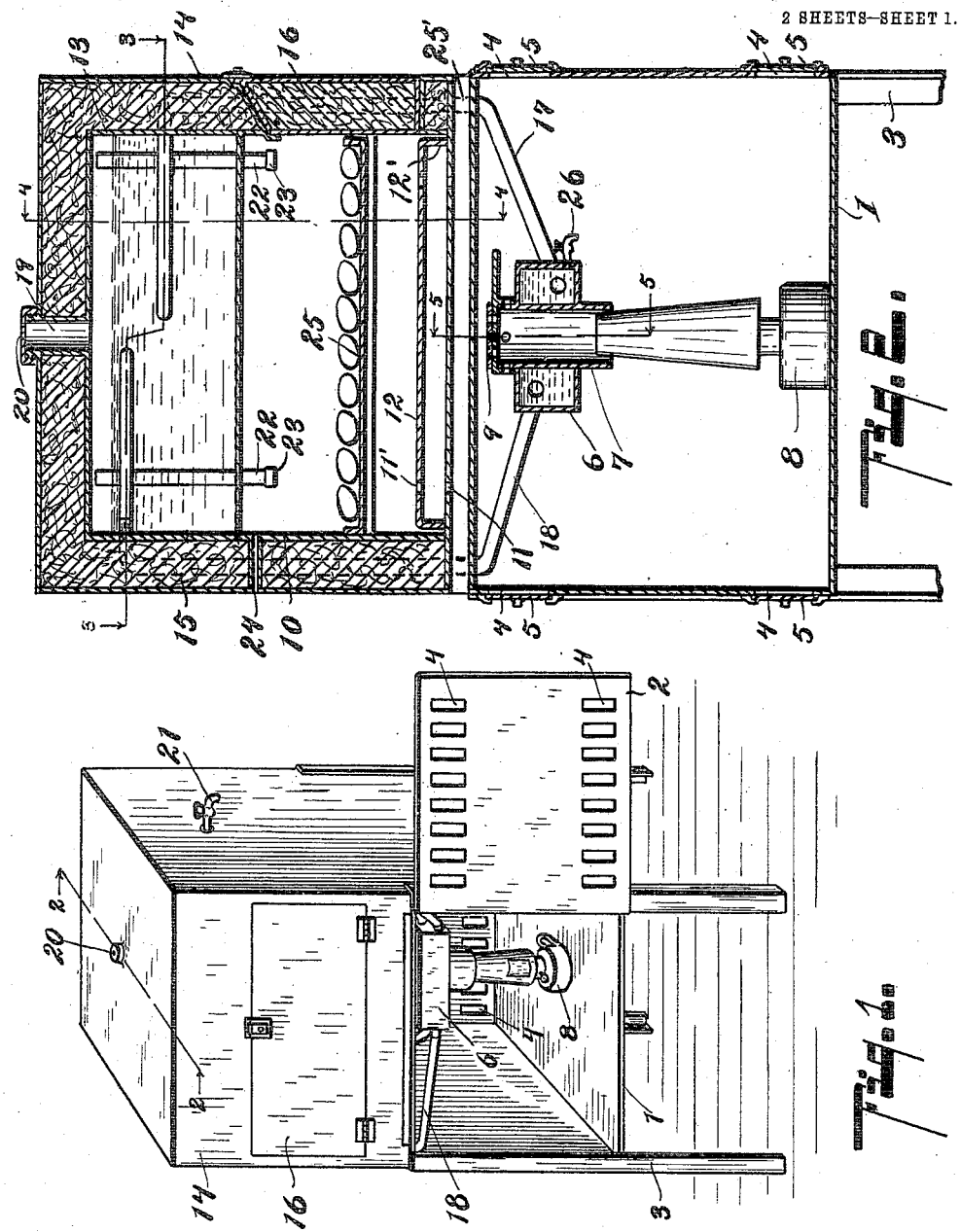

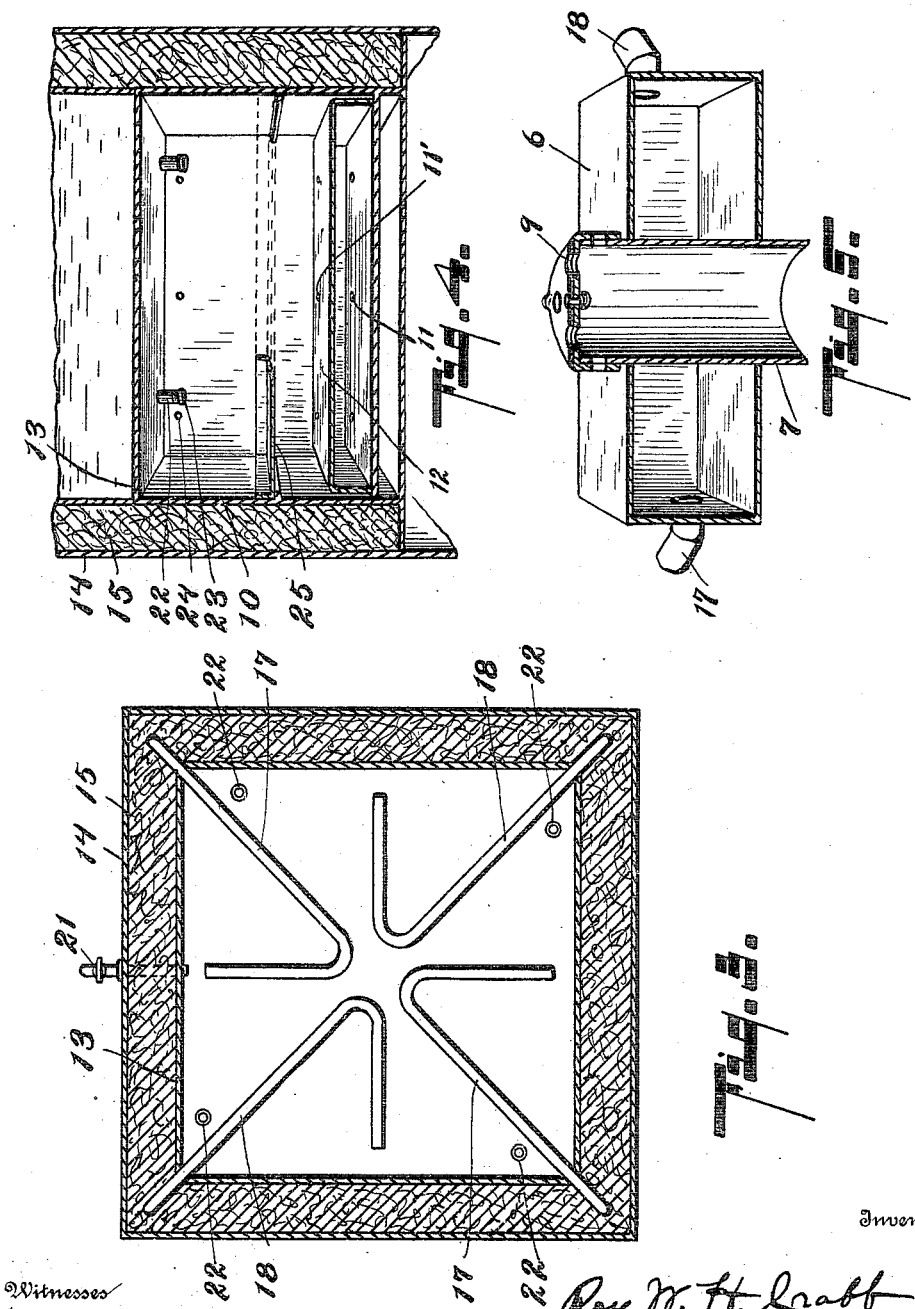

ROY W. H. CRABB, OF BATTLE CREEK, MICHIGAN.

INCUBATOR.

986,367.          Specification of Letters Patent.        Patented Mar. 7, 1911.

Application filed February 9, 1910. Serial No. 542,902.

*To all whom it may concern:*

Be it known that I, ROY W. H. CRABB, a citizen of the United States, residing at Battle Creek, Michigan, have invented certain new and useful Improvements in Incubators, of which the following is a specification.

This invention relates to improvements in incubators.

The main objects of this invention are: First, to provide an improved incubator in which the heat can be very easily and accurately controlled, it being possible to maintain an even temperature and to vary the conditions as desired for different stages of incubation. Second, to provide an improved incubator which is comparatively simple and economical in structure, and also one which is compact.

Further objects, and objects relating to structural details, will definitely appear from the detailed description to follow.

I accomplish the objects of my invention by the devices and means described in the following specification.

The structure described constitutes one effective embodiment of my invention. Other embodiments would be readily devised by those skilled in the art.

The invention is clearly defined and pointed out in the claims.

A structure constituting an effective and preferred embodiment of the features of my invention is clearly illustrated in the accompanying drawing, forming a part of this specification, in which:

Figure 1 is a perspective view of a structure embodying the features of my invention, the door of the heating chamber being open. Fig. 2 is a vertical central section taken on a line corresponding to line 2—2 of Fig. 1. Fig. 3 is a horizontal section taken on a line corresponding to line 3—3 of Fig. 2. Fig. 4 is a detail perspective, partially sectioned, on a line corresponding to the line 4—4 of Fig. 2, parts of the egg tray and the removable false bottom or partition of the egg chamber being broken away. Fig. 5 is a detail perspective of the heating boiler, partially in section, taken on a line corresponding to line 5—5 of Fig. 2.

Referring to the drawing, the heating chamber 1 is provided with a door 2 in one side, the door being, in the structure illustrated, an entire side wall. The structure is preferably provided with legs 3 to support it in an elevated position. The heating chamber is preferably provided with series of vent openings 4 in the opposite walls, the vent openings being arranged at the tops and bottoms of the walls, and provided with slide closures 5, so that the heat in this chamber may be very accurately regulated. In this chamber I arrange the heating boiler 6, which has a flue 7 therethrough for the lamp 8. At the upper end of this flue is a damper 9.

Above the heating chamber is an egg or incubating chamber 10. Between the bottom of the egg or incubating chamber and the top of the heating chamber I preferably provide an air space 25, which is preferably open at the opposite ends. This air space prevents the direct heat from the top of the air chamber injuriously affecting the incubating or egg chamber. The bottom of the egg chamber is preferably provided with circulation openings 11, so that the air may pass from this space 25 into the egg or incubating chamber.

A false bottom 12 is preferably provided, this false bottom being adapted to form a partition across the egg chamber, reducing the air capacity thereof, and also serving as an additional guard against overheating. This false bottom is preferably provided with downwardly turned flanges 12′ at opposite edges, which support it in an elevated position. The false bottom 12 is provided with circulation openings 11′. Toward the end of the incubating period this false bottom is preferably removed, thus increasing the air space of the egg or incubating chamber.

Above the egg chamber is a water reservoir 13. The egg chamber and the reservoir 13 are provided with a casing or outer wall 14, which is spaced from the walls thereof to form a space for the non-conducting packing material 15, which is arranged about the egg chamber except the bottom and top thereof, and about the reservoir 13. The door 16 for the egg chamber is also preferably double walled and provided with the packing material. The reservoir 13 is connected to the boiler by means of the circulation pipes 17 and 18, the pipes 18 being the delivery pipes and the pipes 17 the return pipes. The upper ends of these pipes are horizontally disposed in the reservoir, they being preferably in the form of V-shaped loops arranged radially in the reservoir with the open ends close to the sides and centrally thereof. The upper ends of the pipes 18 are disposed in a plane above that of the pipes 17, and their lower ends are connected to the boiler 6 in a place above that of the pipes 17, so that circulation of water is insured. By forming and disposing the ends of the pipes in the reservoir as shown, an even heating of the reservoir is insured, as th pipes are well distributed therein, and further, a complete circulation of the water is obtained. The reservoir is provided with a filling opening 19, with a vented closure 20, the opening 19 being preferably adapted to receive a thermometer therethrough. The reservoir is also provided with a faucet 21 so that the water can be drawn from the reservoir when desired. This is a very desirable feature, as in the event of the water becoming overheated owing to the lamp getting out of order, or from other causes, a portion of the overheated water can be drawn off and cold water introduced until the water in the reservoir is brought to the proper temperature, and overheating of the eggs prevented, or in the event that the lamp should become extinguished and the water in the reservoir become cold, it can be drawn off and hot water introduced, and the chilling of the eggs may possibly be thus prevented. This in practice is found to be a very desirable feature.

A draw-off cock 26 is preferably provided for draining the boiler as occasion may require.

To secure the proper humidity in the egg chamber, I provide pipes 22 which open into the reservoir above the water level thereof, their lower ends opening into the egg chamber and being preferably provided with closures 23, as in practice I find that it is desirable to increase the humidity in the egg chamber toward the end of the incubating period. Also, the false bottom or partition 12 is preferably removed toward the end of the incubating period.

Vent openings 24 are preferably provided at the top of the egg chamber. The egg chamber is provided with an egg tray 25.

My improved incubator is capable of very accurate regulation, so that an even degree of heat may be maintained, and also the humidity in the egg chamber regulated as is desirable for the different periods or stages of incubation.

I have illustrated and described my improvements in the form in which I have embodied them in practice, and which I find to be a desirable and efficient embodiment thereof. I am aware, however, that structural details may be considerably varied without departing from my invention, and I desire to be understood as claiming the same not only in the specific form illustrated, but broadly as well within the scope of the appended claims.

Having thus described my invention, what I claim as new and desire to secure by Letters Patent is:

1. In an incubator, the combination of a heating chamber having a series of vent openings across opposite side walls at the top and bottom thereof; adjustable closures for said vent openings; an egg chamber arranged above said heating chamber, there being an air chamber between the top of said heating chamber and the bottom of said egg chamber, the bottom of said egg chamber having circulation openings therein, said chamber being provided with a vent opening; a false or removable bottom adapted to form a partition across said egg chamber, supported in a spaced relation to said bottom thereof, said false bottom having circulation openings therein; a water reservoir arranged above said egg chamber; a casing or outer wall inclosing said egg chamber and water reservoir, said outer wall being spaced from the walls of said egg chamber and water reservoir, the wall space having non-conducting material therein; a boiler having a lamp flue therethrough arranged centrally in said heating chamber; a damper at the upper end of said flue; circulation pipes connecting said boiler with said reservoir, said pipes being arranged in the corners of said casing and having horizontally disposed loops on their upper ends arranged radially in said reservoir to open at the sides thereof, the upper ends of one pair of said pipes being in a plane above that of the other, their lower ends being connected to said boiler in a plane above that of the other; pipes connecting said egg chamber with said reservoir, the upper ends of said pipes being above the water level of the reservoir, their lower ends being provided with closures, said reservoir being provided with a filling opening having a vented closure, said filling opening being adapted to receive a thermometer therethrough; and a draw-off faucet for said reservoir.

2. In an incubator, the combination of a heating chamber having a series of vent openings across opposite side walls at the top and bottom thereof; adjustable closures for said vent openings; an egg chamber arranged above said heating chamber, there being an air chamber between the top of said heating chamber and the bottom of said egg chamber, the bottom of said egg chamber having circulation openings therein, said chamber being provided with a vent opening; a false or removable bottom adapted to form a partition across said egg chamber, supported in a spaced relation to said bottom thereof, said false bottom having circulation openings therein; a water reservoir arranged above said egg chamber; a casing or outer wall inclosing said egg chamber and water reservoir, said outer wall being spaced from the walls of said egg chamber and water reservoir, the wall space having non-conducting material therein; a boiler having a lamp flue arranged centrally in said heating chamber; a damper at the upper end of said flue; circulation pipes connecting said boiler with said reservoir, said pipes being arranged in the corners of said casing and having horizontally disposed loops on their upper ends arranged radially in said reservoir to open at the sides thereof, the upper ends of one pair of said pipes being in a plane above that of the other, their lower ends being connected to said boiler in a plane above that of the other; and pipes connecting said egg chamber with said reservoir, the upper ends of said pipes being above the water level of the reservoir, their lower ends being provided with closures.

3. In an incubator, the combination of a heating chamber; an egg chamber arranged above said heating chamber, there being an air chamber between the top of said heating casing or outer wall inclosing said egg chamber, the bottom of said egg chamber having circulation openings therein; a water reservoir arranged above said egg chamber; a casing or outer wall inclosing said egg chamber and water reservoir, said outer wall being spaced from the walls of said egg chamber and water reservoir, the wall space having non-conducting material therein; a boiler having a lamp flue therethrough arranged centrally in said heating chamber; a damper at the upper end of said flue; circulation pipes connecting said boiler with said reservoir, said pipes being arranged in the corners of said casing and having horizontally disposed loops on their upper ends arranged radially in said reservoir to open at the sides thereof, the upper ends of one pair of said pipes being in a plane above that of the other, their lower ends being connected to said boiler in a plane above that of the other, said reservoir being provided with a filling opening having a vented closure, said filling opening being adapted to receive a theremometer therethrough; and a draw-off faucet for said reservoir.

4. In an incubator, the combination of a heating chamber; an egg chamber arranged above said heating chamber; a water reservoir arranged above said egg chamber; a casing or outer wall inclosing said egg chamber and water reservoir, said outer wall being spaced from the walls of said egg chamber and water reservoir, the wall space having non-conducting material therein; a boiler having a lamp flue therethrough arranged centrally in said heating chamber; a damper at the upper end of said flue; and circulation pipes connecting said boiler with said reservoir, said pipes being arranged in the corners of said casing and having horizontally disposed loops on their upper ends arranged radially in said reservoir to open at the sides thereof, the upper ends of one pair of said pipes being in a plane above that of the other, their lower ends being connected to said boiler in a plane above that of the other.

5. In an incubator, the combination of a heating chamber having a series of vent openings across opposite side walls at the top and bottom thereof; adjustable closures for said vent openings; an egg chamber arranged above said heating chamber, there being an air chamber between the top of said heating chamber and the bottom of said egg chamber, the bottom of said egg chamber having circulation openings therein, said chamber being provided with a vent opening; a false or removable bottom adapted to form a partition across said egg chamber, supported in a spaced relation to said bottom thereof, said false bottom having circulation openings therein; a water reservoir arranged above said egg chamber; a casing or outer wall inclosing said chamber and water reservoir, said outer wall being spaced from the walls of said egg chamber and water reservoir, the wall space having non-conducting material therein; a boiler having a lamp flue therethrough arranged centrally in said heating chamber; a damper at the upper end of said flue; circulation pipes connecting said boiler with said reservoir; pipes connecting said egg chamber with said reservoir, the upper ends of said pipes being above the water level of the reservoir, their lower ends being provided with closures, said reservoir being provided with a filling opening having a vented closure, said filling opening being adapted to receive a thermometer therethrough; and a draw-off faucet for said reservoir.

6. In an incubator, the combination of a heating chamber having a series of vent openings across opposite side walls at the top and bottom thereof; adjustable closures for said vent openings; an egg chamber arranged above said heating chamber, there being an air chamber between the top of said heating chamber and the bottom of said egg chamber, the bottom of said egg chamber having circulation openings therein, said chamber being provided with a vent opening; a false or removable bottom adapted to form a partition across said egg chamber, supported in a spaced relation to said bottom thereof, said false bottom having circulation openings therein; a water reservoir arranged above said egg chamber; a casing or outer wall inclosing said egg chamber and water reservoir, said outer wall being spaced from the walls of said egg chamber and water reservoir, the wall space having non-conducting material therein; a boiler having a lamp flue therethrough arranged centrally in said heating chamber; a damper at the upper end of said flue; circulation pipes connecting said boiler with said reservoir; and pipes connecting said egg chamber with said reservoir, the lower ends of said pipes being provided with closures.

7. In an incubator, the combination of a heating chamber; an egg chamber arranged above said heating chamber, there being an air chamber between the top of said heating chamber and the bottom of said egg chamber, the bottom of said egg chamber having circulation openings therein; a water reservoir arranged above said egg chamber; a casing or outer wall inclosing said egg chamber and water reservoir, said outer wall being spaced from the walls of said egg chamber and water reservoir, the wall space having non-conducting material therein; a boiler having a lamp flue therethrough arranged centrally in said heating chamber; a damper at the upper end of said flue; and circulation pipes connecting said boiler with said reservoir.

8. In an incubator, the combination of a heating chamber; an egg chamber arranged above said heating chamber; a water reservoir arranged above said egg chamber; a casing or outer wall inclosing said egg chamber and water reservoir, said outer wall being spaced from the walls of said egg chamber and water reservoir, the wall space having non-conducting material therein; a boiler having a lamp flue therethrough arranged centrally in said heating chamber; a damper at the upper end of said flue; and circulation pipes connecting said boiler with said reservoir, said pipes being arranged in the corners of said casing and having horizontally-disposed loops on their upper ends arranged radially in said reservoir to open at the sides thereof, the upper ends of one pair of said pipes being in a plane below that of the other, their lower ends being connected to said boiler in a plane above that of the other.

9. In an incubator, the combination of a heating chamber; an egg chamber arranged above said heating chamber, there being an air chamber between the top of said heating chamber and the bottom of said egg chamber, the bottom of said egg chamber having circulation openings therein, said chamber being provided with a vent opening; a false or removable bottom adapted to form a partition across said egg chamber, supported in a spaced relation to said bottom thereof, said false bottom having circulation openings therein; a water reservoir arranged above said egg chamber; a casing or outer wall inclosing said egg chamber and water reservoir; a boiler in said heating chamber; circulation pipes connecting said boiler with said reservoir, said pipes being arranged in the corners of said casing and having horizontally disposed loops on their upper ends arranged radially in said reservoir to open at the sides thereof, the upper ends of one pair of said pipes being in a plane above that of the other, their lower ends being connected to said boiler in a plane above that of the other; pipes connecting said egg chamber with said reservoir, the upper ends of said pipes being above the water level of the reservoir, their lower ends being provided with closures, said reservoir being provided with a filling opening having a vented closure, said filling opening being adapted to receive a thermometer therethrough; and a draw-off faucet for said reservoir.

10. In an incubator, the combination of a heating chamber; an egg chamber arranged above said heating chamber, there being an air chamber between the top of said heating chamber and the bottom of said egg chamber, the bottom of said egg chamber having circulation openings therein; a false or removable bottom adapted to form a partition across said egg chamber, supported in a spaced relation to said bottom thereof, said false bottom having circulation openings therein, said chamber being provided with a vent opening; a water reservoir arranged above said egg chamber; a casing or outer wall inclosing said egg chamber and water reservoir; a boiler in said heating chamber; circulation pipes connecting said boiler with said reservoir, said pipes being arranged in the corners of said casing and having horizontally disposed loops on their upper ends arranged radially in said reservoir to open at the sides thereof, the upper ends of one pair of said pipes being in a plane above that of the other, their lower ends being connected to said boiler in a plane above that of the other; and pipes connecting said egg chamber with said reservoir, the upper ends of said pipes being above the water level of the reservoir, their lower ends being provided with closures.

11. In an incubator, the combination of a heating chamber; an egg chamber arranged above said heating chamber; a water reservoir arranged above said egg chamber, said reservoir being provided with a filling opening having a vented closure, said filling opening being adapted to receive a thermometer therethrough; a casing or outer wall inclosing said egg chamber and water reservoir; a boiler in said heating chamber; circulation pipes connecting said boiler with said reservoir, said pipes being arranged in the corners of said casing and having horizontally disposed loops on their upper ends arranged radially in said reservoir to open at the sides thereof, the upper ends of one pair of said pipes being in a plane above that of the other, their lower ends being connected to said boiler in a plane above that of the other.

12. In an incubator, the combination of a heating chamber; an egg chamber arranged above said heating chamber; a water reservoir arranged above said egg chamber; a casing or outer wall inclosing said egg chamber and water reservoir; a boiler in said heating chamber; and circulation pipes connecting said boiler with said reservoir, said pipes being arranged in the corners of said casing and having horizontally disposed loops on their upper ends arranged radially in said reservoir to open at the sides thereof, the upper ends of one pair of said pipes being in a plane above that of the other, their lower ends being connected to said boiler in a plane above that of the other.

13. In an incubator, the combination of a heating chamber; an egg chamber arranged above said heating chamber, there being an air chamber between the top of said heating chamber and the bottom of said egg chamber, the bottom of said egg chamber having circulation openings therein, said chamber being provided with a vent opening; a false or removable bottom adapted to form a partition across said egg chamber, supported in a spaced relation to said bottom thereof, said false bottom having circulation openings therein; a water reservoir arranged above said egg chamber; a casing or outer wall inclosing said egg chamber and water reservoir; a boiler in said heating chamber; circulation pipes connecting said boiler with said reservoir; pipes connecting said egg chamber with said reservoir, the upper ends of said pipes being above the water level of the reservoir, their lower ends being provided with closures, said reservoir being provided with a filling opening having a vented closure, said filling opening being adapted to receive a thermometer therethrough; and a draw-off faucet for said reservoir.

14. In an incubator, the combination of a heating chamber; an egg chamber arranged above said heating chamber, there being an air chamber between the top of said heating chamber and the bottom of said egg chamber, the bottom of said egg chamber having circulation openings therein, said chamber being provided with a vent opening; a false or removable bottom adapted to form a partition across said egg chamber, supported in a spaced relation to said bottom thereof, said false bottom having circulation openings therein; a water reservoir arranged above said egg chamber; a casing or outer wall inclosing said egg chamber and water reservoir; a boiler in said heating chamber; circulation pipes connecting said boiler with said reservoir; and pipes connecting said egg chamber with said reservoir, the upper ends of said pipes being above the water level of the reservoir, their lower ends being provided with closures.

In witness whereof, I have hereunto set my hand and seal in the presence of two witnesses.

ROY W. H. CRABB. [L. S.]

Witnesses:
BURRITT HAMILTON,
NELSON A. BEARDSLEE.

---

Copies of this patent may be obtained for five cents each, by addressing the "Commissioner of Patents, Washington, D. C."